US011320980B1

(12) United States Patent  
Barber et al.

(10) Patent No.: US 11,320,980 B1  
(45) Date of Patent: May 3, 2022

(54) FLIGHT AND TASK MANAGEMENT TIMELINE DISPLAY WITH ABSOLUTE AND RELATIVE TIME SCALING

(71) Applicant: Rockwell Collins, Inc., Cedar Rapids, IA (US)

(72) Inventors: Sarah Barber, Cedar Rapids, IA (US); Bryan C. Schultz, Marion, IA (US); Anthony Deniau, Bretx (FR); Philippe Salmon, Colomiers (FR); Fabrice Guillermin, Colomiers (FR); Laetitia Bornes, Toulouse (FR); Alexandre Lemort, Toulouse (FR)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/185,591

(22) Filed: Feb. 25, 2021

(51) Int. Cl.
*G06F 3/0485* (2022.01)
*G06F 3/041* (2006.01)
(Continued)

(52) U.S. Cl.
CPC ........... *G06F 3/0485* (2013.01); *B64D 43/00* (2013.01); *G06F 3/041* (2013.01); *G06F 3/0481* (2013.01);
(Continued)

(58) Field of Classification Search
CPC .. G06F 3/04847; G06F 3/048; G06F 3/04842; G06F 3/04845; G06F 3/04855; G06F 3/0481; G06F 3/0484; G06F 3/0486; G06F 40/103; G06F 40/166; G06F 9/451; G06F 9/543; G06F 2203/04803; G06F 3/0482; G06F 16/29; G06F 3/04883; G06F 16/433; G06F 16/444; G06F 16/68; G06F 16/9535; G06F 2203/04806; G06F 2203/04808; G06F 30/20; G06F 30/333; G06F 3/017; G06F 3/04815
See application file for complete search history.

(56) References Cited

U.S. PATENT DOCUMENTS 7,765,061 B1 7/2010 Barber et al.
8,050,860 B2 11/2011 Peyrucain et al.
(Continued)

FOREIGN PATENT DOCUMENTS

FR 2984486 A1 6/2013

*Primary Examiner* — Rayeez R Chowdhury
(74) *Attorney, Agent, or Firm* — Suiter Swantz pc llo

(57) ABSTRACT

A system for flight and task management timeline display is disclosed. In embodiments, the timeline display is positioned on an edge of a primary flight display (PFD) or other avionics display, divided lengthwise into time (e.g., absolute time) and space (e.g., relative time and distance) scales. The timeline display expands situational awareness into the temporal dimension by positioning waypoints in the flight path based on the relative time to passage or flyover. The time scale corresponds to an adjustable time range and automatically scrolls lengthwise according to the current time, but can be manually zoomed or scrolled in past and future directions as well. Based on updates from the flight management system (FMS), the space scale displays relative time-distanced events, notifications for reminders and tasks, and waypoints positioned according to the likely times they will be encountered (or, in the case of reminders and tasks, must be fulfilled).

14 Claims, 15 Drawing Sheets

(51) Int. Cl.
 *G06F 3/0481* (2022.01)
 *B64D 43/00* (2006.01)
 *G06F 3/0488* (2022.01)
 *G08B 5/22* (2006.01)
 *G06F 3/04842* (2022.01)

(52) U.S. Cl.
 CPC ........ *G06F 3/0488* (2013.01); *G06F 3/04842* (2013.01); *G08B 5/22* (2013.01); *G06F 2203/04806* (2013.01)

(56) References Cited

U.S. PATENT DOCUMENTS

| | | |
|---|---|---|
| 8,099,201 B1 | 1/2012 | Barber et al. |
| 8,725,320 B1 | 5/2014 | Pschierer |
| 9,202,381 B2 | 12/2015 | Aymeric et al. |
| 9,292,159 B2 | 3/2016 | Roux et al. |
| 9,335,917 B2 | 5/2016 | Dostal et al. |
| 9,494,945 B2 | 11/2016 | Coulmeau et al. |
| 2014/0156115 A1* | 6/2014 | Aymeric ............. G06F 3/04817 701/3 |
| 2020/0168104 A1* | 5/2020 | Holder ................. G08G 5/0039 |

* cited by examiner

FLIGHT AND TASK MANAGEMENT TIMELINE DISPLAY WITH ABSOLUTE AND RELATIVE TIME SCALING

BACKGROUND

Modern aircraft navigation is increasingly not just three-dimensional, but four-dimensional; area navigation (RNAV) or other forms of instrument flight rules (IFR) based navigation along a desired flight path may depend on a series of waypoints, or station-referenced navigational beacons. For example, a commercial aircraft on approach to land at an airport, where its arrival must be coordinated with other aircraft arriving thereat and departing therefrom along other flight paths, may be required to traverse a sequence of waypoints (each waypoint having a particular latitude and longitude) by flying by or over each waypoint both at a predetermined altitude and at a predetermined time.

Flight management systems (FMS) may calculate a required time of arrival (RTA) for each waypoint, indicating the earliest and latest times at which the aircraft could arrive at a particular waypoint based on, e.g., aircraft performance and external environmental conditions. However, conventional avionics systems may not display this information in sufficiently intuitive, graphic, and non-intrusive fashion (e.g., blending with, rather than supplanting, primary flight and/or navigational displays) to provide pilots and crew with full four-dimensional situational awareness incorporating not only positional awareness, but temporal awareness.

SUMMARY

Embodiments of the inventive concepts disclosed herein are directed to an avionics display system configured for intuitive and interactive display of time-sensitive and time-related events, both as they occur and as the aircraft approaches these events in real time. More efficient task and event management combined with a reduction in mental workload expands situational awareness into the temporal dimension and keeps the pilot and flight crew "ahead of the aircraft" without undue interference with regular primary flight and/or instrumentation displays.

A system for flight management timeline display is disclosed. In embodiments, the system includes a primary flight display (PFD), multifunction display (MFD), portable electronic flight bag (EFB), or other like avionics display in communication with an aircraft flight management system (FMS) and other flight deck and/or EFB applications. For example, the avionics display generates a timeline display along an edge portion, the timeline display split lengthwise into an absolute time scale and a space scale, e.g., a relative time and distance scale. The time scale displays a time range or window that scrolls automatically as time elapses. The space scale displays relative times and distances for waypoints and events based on the time (e.g., past time, future time, predicted time) when the aircraft arrives at a waypoint or an event occurs. For example, the space scale may show relative times and distances to waypoints based on the current time and the expected time of arrival at the waypoint, the expected time corresponding to an absolute time on the time scale. Similarly, the time scale shows the relative time until events (e.g., alerts, tasks, reminders) will (or should) occur based on the current time and the predetermined or expected times of the said events.

In some embodiments, the timeline display may be manually scrolled (e.g., via touchscreen or multifunction control (MFC) in past or future directions, such that the time display shows a time window partially or fully in the past or future.

In some embodiments, the scrolled timeline display shows, instead of the current time, a past or future time reference corresponding to the past or future direction in which the timeline display is scrolled.

In some embodiments, the scrolled timeline display includes a time synch box displaying the current time.

In some embodiments, the scrolled timeline display synchronizes back to the current time (and to the corresponding time window) when the time synch box is selected (e.g., clicked).

In some embodiments, the timeline display can be manually zoomed to expand or contract the time scale, e.g., to a shorter or longer absolute time range.

In some embodiments, the timeline display groups waypoints or events as groups, e.g., when the waypoints or events are sufficiently temporally close together; grouped waypoints or events can be selected to display each individual waypoint or event of the group.

In some embodiments, a waypoint can be selected to display additional information about the waypoint.

In some embodiments, an event can be selected to display additional information about the event.

In some embodiments, displayable events include, but are not limited to: top of descent (TOD) or other vertical navigation (VNAV) inflection points; weather alerts or other alerts tracked by the FMS; tasks for completion by the flight crew; and reminders set by the flight crew.

In some embodiments, the timeline display shows a task queue alert including any missed events, e.g., that have scrolled by the timeline without action from the flight crew.

In some embodiments, the task queue alert can be selected to show additional task information corresponding to any missed tasks or events.

In some embodiments, display elements are selectable via a touch-sensitive surface of the avionics display or via a multifunction control (MFC), e.g., for cursor-based selection.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
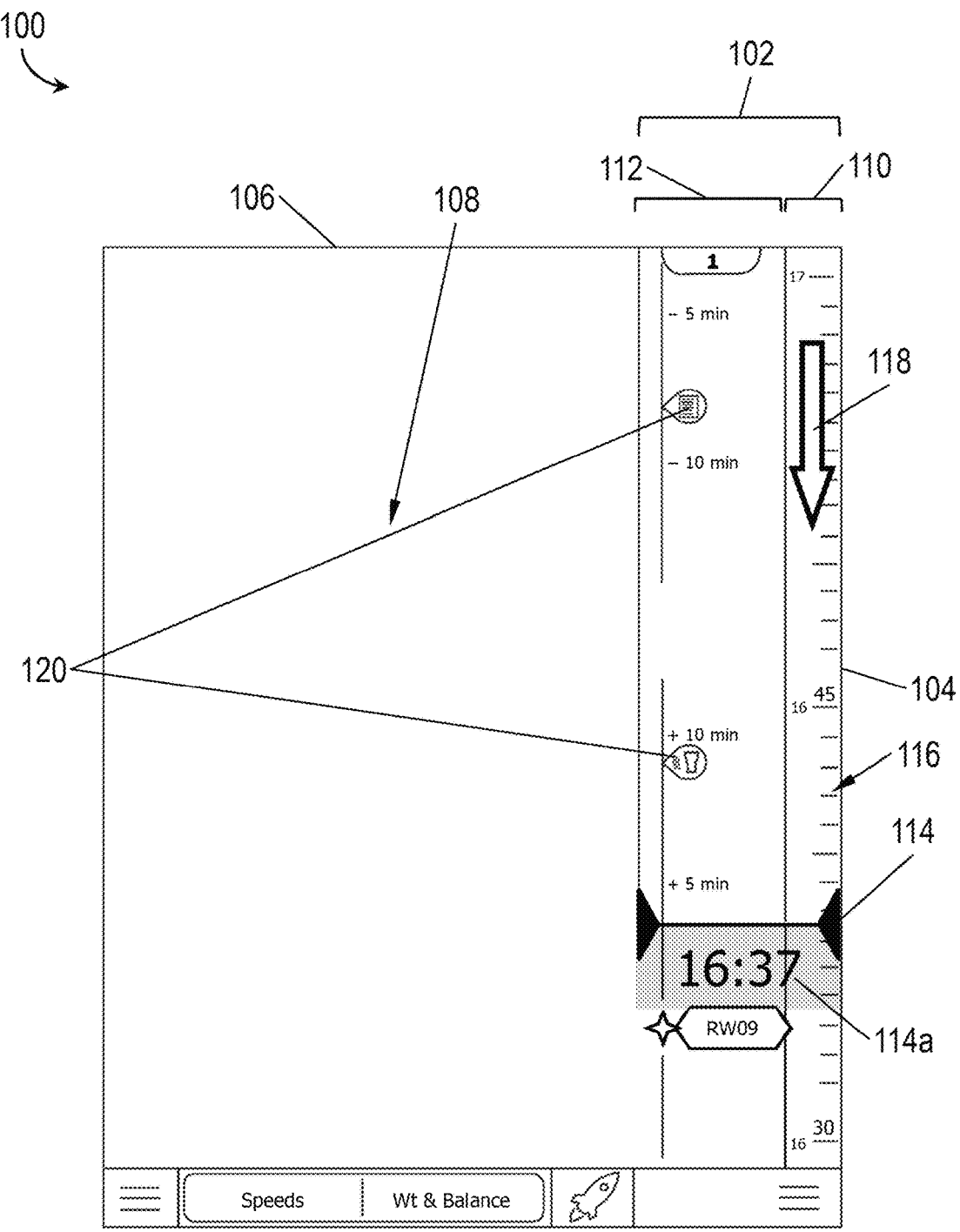
FIG. 1 is a block diagram illustrating an avionics display incorporating a timeline display according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, an avionics display 100 is disclosed. The avionics display may include, but is not limited to, a cockpit-based primary flight display (PFD), aircraft-based multifunction display (MFD), or portable electronic flight bag (EFB; e.g., an avionics display housed in a tablet or other portable processing device) in communication, either physically or wirelessly, with the aircraft flight management system (FMS) or other cockpit-based or EFB-based applications (e.g., smart assistants, schedulers).

In embodiments, the avionics display 100 includes a timeline display 102 situated along an edge 104 of the avionics display. For example, the timeline display 102 may preferably be situated along a vertical edge 104 of the avionics display 100 and occupy a vertical slice of the avionics display; however, in some embodiments the timeline display 102 may be situated along a horizontal edge 106 of the avionics display. The unused portion 108 of the avionics display (e.g., that portion not occupied by the timeline display 102) may be used for normal display of navigational elements, aircraft instrumentation readouts, or other avionics display content.

In embodiments, the timeline display 102 may be divided lengthwise (e.g., split vertically) into a time scale 110 (e.g., absolute time scale) and a space scale 112 (e.g., relative time or distance scale). For example, the time scale 110 may indicate the current time (e.g., as indicated by a time cursor 114 and/or time cursor readout 114a) according to any desired time reference selected by the pilot or flight crew (e.g., UTC, local time zone, destination time zone). The time scale 110 may include time increment markers 116 and may be configured for automatic edgewise scrolling (118), e.g., from top to bottom according to the current time. In embodiments, as the time scale 110 represents a time range (e.g., which may or may not include the current time, as disclosed in greater detail below), the time scale may indicate points ahead of and/or behind the current time (e.g., future and past points).

In embodiments, the avionics display 100 may poll the FMS (e.g., and/or other flight management/flight guidance applications) for updates as to the current position and speed (e.g., airspeed, groundspeed) of the aircraft. For example, based on this information as well as flight plan data, the avionics display may additionally infer or predict the aircraft position at a future point in time (e.g., based on a current position and a consistent speed over time) or predict the aircraft speed at a future point in time (e.g., based on a deceleration of the aircraft). In embodiments, the space scale 112 may display time-distanced events 120 relative to the time cursor 114, e.g., relative distance or time to and from flight plan waypoints (or, e.g., until events occur, until tasks must be performed). For example, flight plan waypoints may be a particular distance from the aircraft at any particular time, and the aircraft may reach the said waypoint by flying by or over it at a destination time (or, e.g., must arrive at the waypoint within a predetermined time window) given its current and/or predicted speed (or, e.g., may have reached the waypoint at a known past time and may be at a particular distance from the waypoint at the current time based on aircraft speed).

Figure 2A:
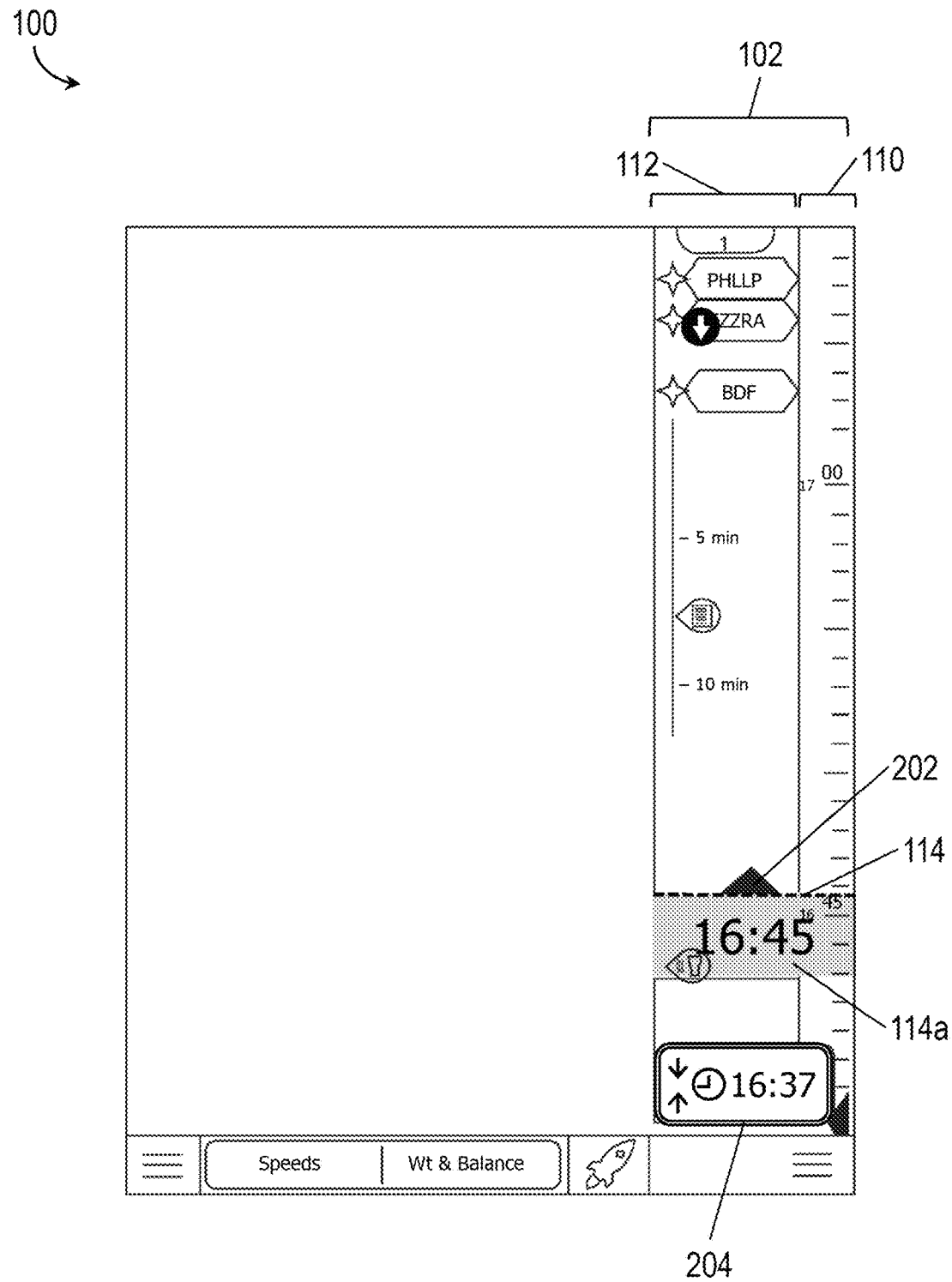
FIGS. 2A through 2C illustrate operations adjusting the absolute time range displayed by the timeline display of FIG. 1.
Figure 2B:
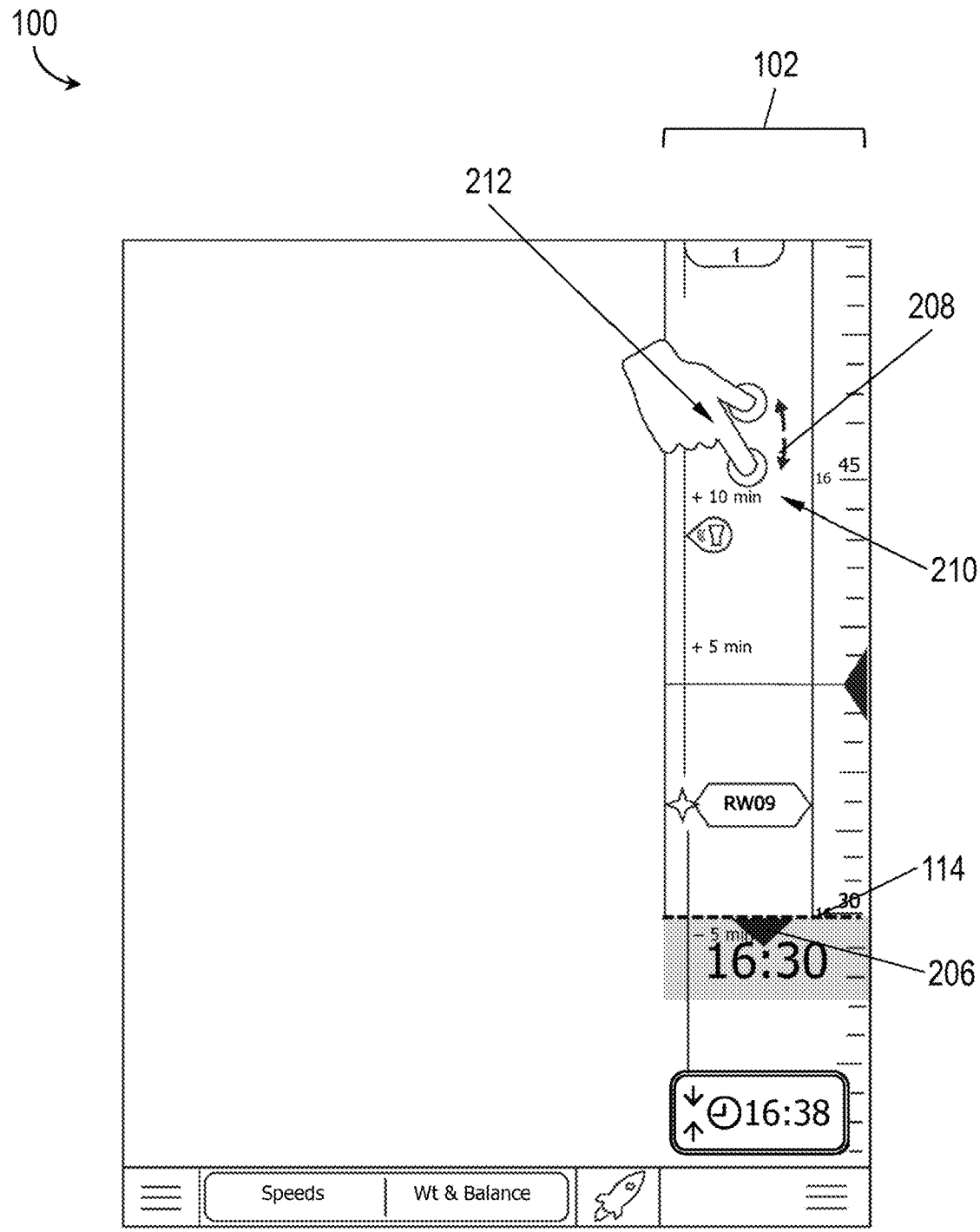
Figure 2C:
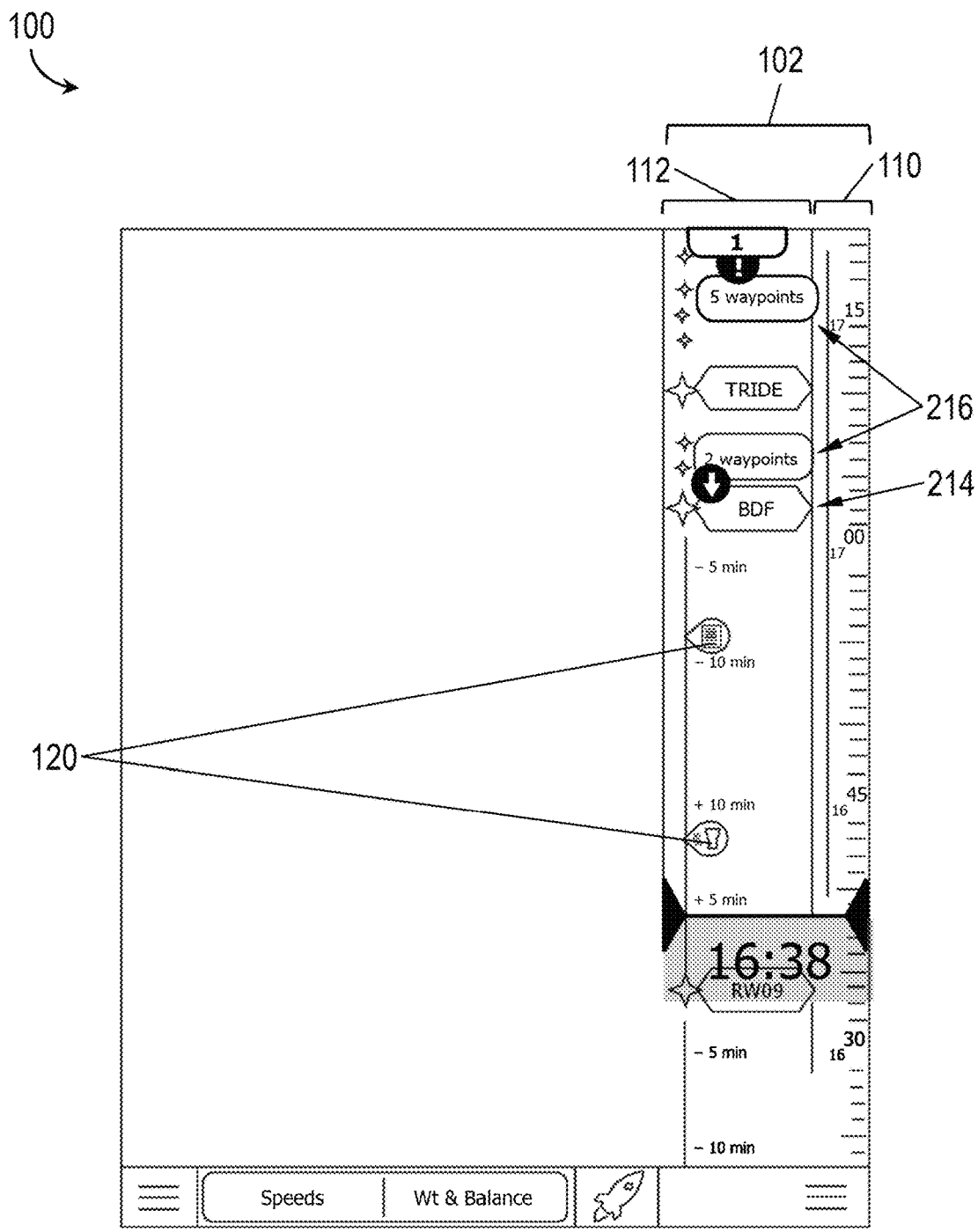

Referring now to FIGS. 2A through 2C, in embodiments the timeline display 102 may be manually scrollable to display future or past time ranges which may or may not include the current time, to allow the flight crew to inspect or monitor future or past events and tasks.

For example, the timeline display 102 may be scrolled in a future direction (e.g., "down", top to bottom) such that the time scale 110 may indicate a time range in the future relative to the current time, the time cursor 114 and time cursor readout 114a shifting to indicate the future time range. For example, the time cursor 114 may display an "upward" arrow 202 to indicate that the currently displayed time range is a future time range, and the time cursor readout 114a may indicate a future time (e.g., 16:45).

In embodiments, when the timeline display 102 is scrolled in either a future or past direction, the timeline display 102 may include a time synch box 204 indicating the actual current time (e.g., 16:37). (It should be noted that the actual current time as reflected by the time cursor 114 may still be within the displayed future time range.) For example, the timeline display 102 may be manually scrolled in either direction via the display surface (e.g., if the display surface is touch-sensitive, the pilot may contact the portion of the display surface corresponding to the absolute time scale and drag either upward or downward, e.g., to scroll into the past or future). Additionally, or alternatively, the time scale 110 may be manually scrolled via a multifunction control (MFC) otherwise configured for control of the avionics display 100. In embodiments, by selecting or contacting the time synch box 204, the timeline display 102 may be re-synchronized to the current time (e.g., as shown by FIG. 1).

Referring also to FIG. 2B, the timeline display 102 may be scrolled in a past direction (e.g., "upward", or bottom-to-top) to display a past time range, as indicated by the "downward" arrow 206 and its position relative to the time cursor 114.

In embodiments, the timeline display 102 may additionally be manually zoomed 208 (e.g., via a touch-sensitive display surface 210 or via MFC) to lengthen or shorten the absolute time range displayed by the time scale 110. For example, expanding the timeline display 102 by zooming in (e.g., by moving two fingers 212 further apart on a touch-sensitive display surface 210) may shorten the absolute time range displayed by the time scale 110. Similarly, the timeline display 102 may be zoomed out (208) in the opposite direction to contract the timeline display and lengthen the absolute time range covered by the time scale 110, e.g., from approximately 24 minutes (as shown by FIG. 2B) to approximately 40 minutes (as shown by FIG. 2C). In embodiments, as the time scale 110 expands or contracts in response to zooming 208, so may the number of time-distanced events 120 indicated by the space scale 112 increase or decrease. In some embodiments, proximate time-distanced events 120 or waypoints 214 (e.g., having event times or arrival times very close to each other) may be contracted into groupings 216, as described in more detail below.

Figure 3A:
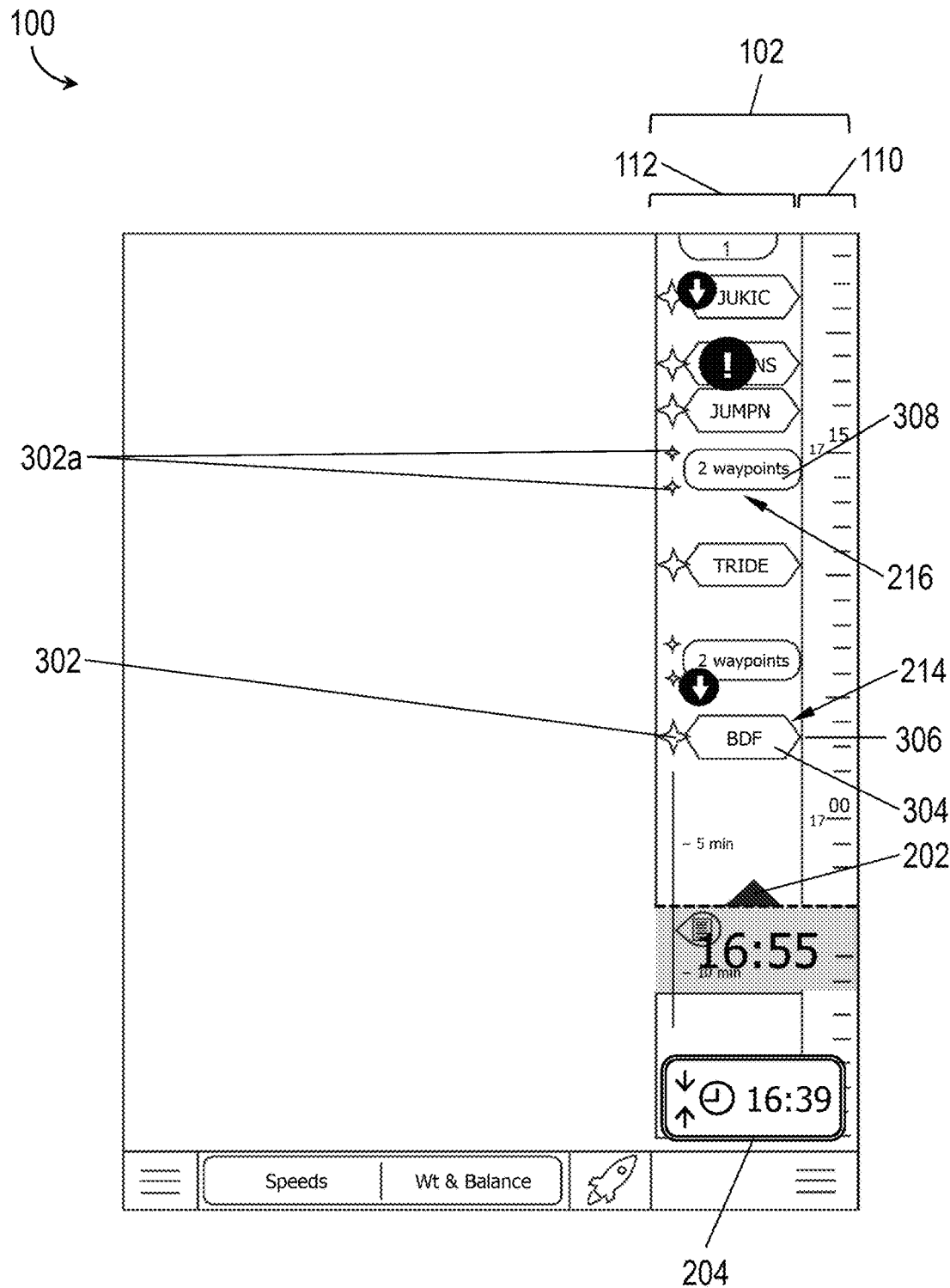
FIGS. 3A through 3C illustrate waypoint displays and information provided by the timeline display of FIG. 1.

Referring now to FIG. 3A, in embodiments the space scale 112 may include the relative time-distanced positions of waypoints 214 in the flight path/flight plan of the aircraft, based on the anticipated time of aircraft passage by, or over, a particular waypoint (e.g., based on the current or anticipated positions of the aircraft, the known location of the waypoint, and the aircraft speed).

In embodiments, the timeline display 102 may be scrolled into the future (e.g., and zoomed in to shorten the absolute time range of the time scale 110, as also shown by FIGS. 2A and 2B). The space scale 112 may indicate the relative positions of waypoints 214 with a waypoint symbol 302 positioned on the space scale 112 to indicate the relative time-distancing of the waypoint from the aircraft (e.g., in minutes to arrival, as well as relative distance to or from other waypoints). For example, the waypoint symbols 302 may indicate the relative time-distancing of indicated waypoints 214 from the future-scrolled upward arrow 202, itself indicating a future time relative to the current time, as indicated by the time synch box 204.

In embodiments, directly adjacent to the waypoint symbol 302 the space scale 112 may place a waypoint label 304 identifying the waypoint 214 (e.g., BDF, TRIDE, JUMPN, JUKIC) and extending into the time scale 110 to indicate the approximate time (306) of waypoint passage by the aircraft. For example, the aircraft may be expected (e.g., according to current conditions) to pass by or over the waypoint BDF at approximately 17:03, the waypoint TRIDE at approximately 17:10, and the waypoint JUMPN at approximately 17:16.

In embodiments, selected waypoints 214 may be so close together (e.g., based on relative distance to/from the aircraft or waypoint passage time 306, and based on the current length of the absolute time range shown by the time scale 110) that it may not always be feasible for the space scale 112 to display each waypoint individually. For example, referring in particular to FIG. 3A, the space scale 112 may indicate waypoint groupings 216 (e.g., groups of two or more proximate waypoints) by minimizing the waypoint symbols (302a) and replacing the waypoint label 304 with an alternative waypoint label (308) indicating the number of grouped waypoints. The minimized waypoint symbols 302a and alternative waypoint label 308 may still indicate the relative time-distancing of the grouped waypoints.

Figure 3B:
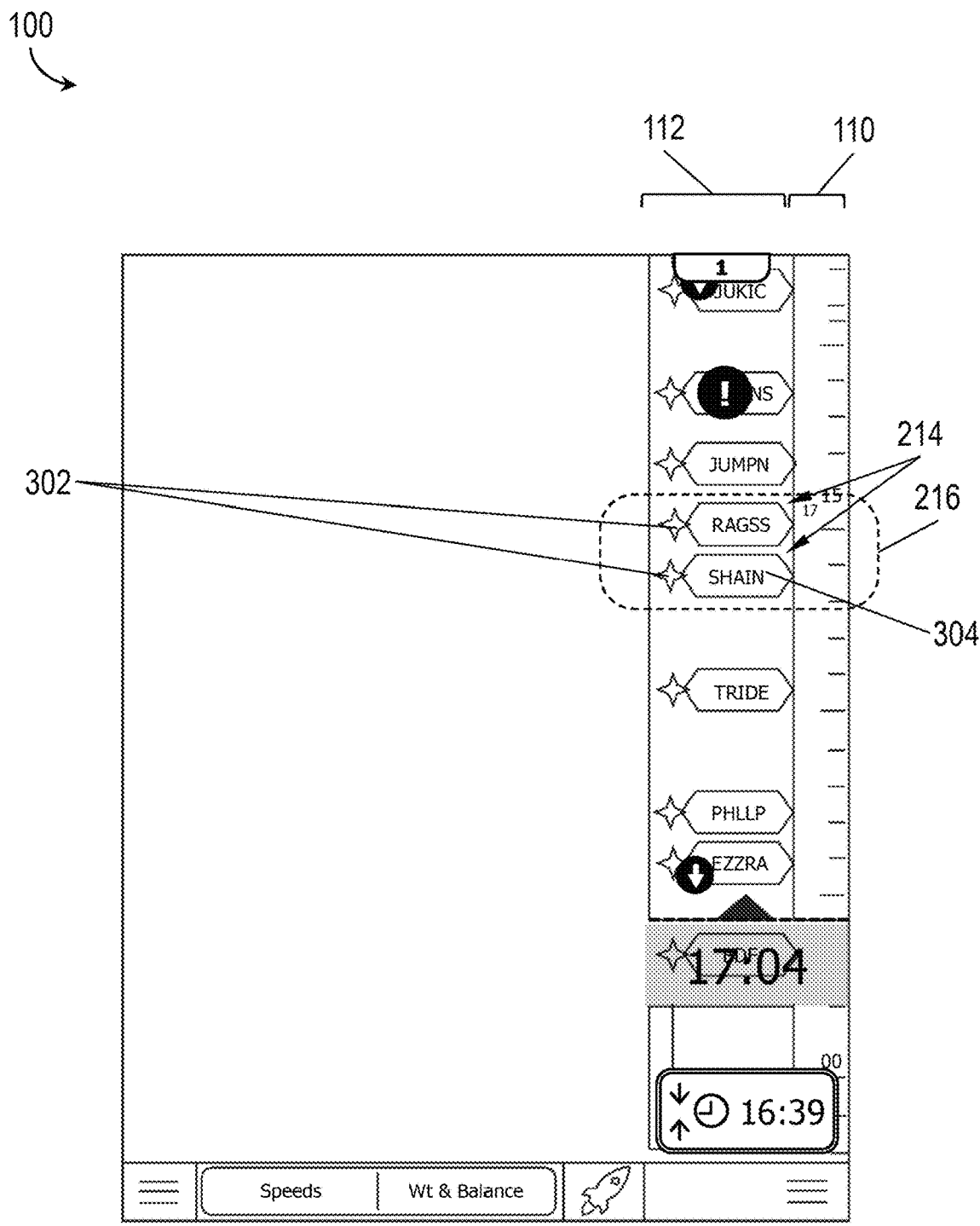

In embodiments, referring also to FIG. 3B, the individual waypoints of a waypoint grouping 216 may be identified by zooming (208, FIG. 2B) the time scale 110 (e.g., zooming into the timeline display 102 to shorten the absolute time range displayed by the time scale). As the time range corresponding to the time scale 110 shortens, the number of waypoints 214 and/or events (120, FIG. 1) displayed by the space scale 112 may likewise decrease until the waypoint groupings 216 are replaced by individual waypoint symbols 302 and waypoint labels 304 for each waypoint 214. For example, the grouping 216 of two waypoints 214 between the waypoints TRIDE and JUMPN, as shown by FIG. 3A, are shown by FIG. 3B as the waypoints RAGGS and SHAIN, each waypoint associated with an individual time (306, FIG. 3A) of waypoint passage by the aircraft.

Figure 3C:
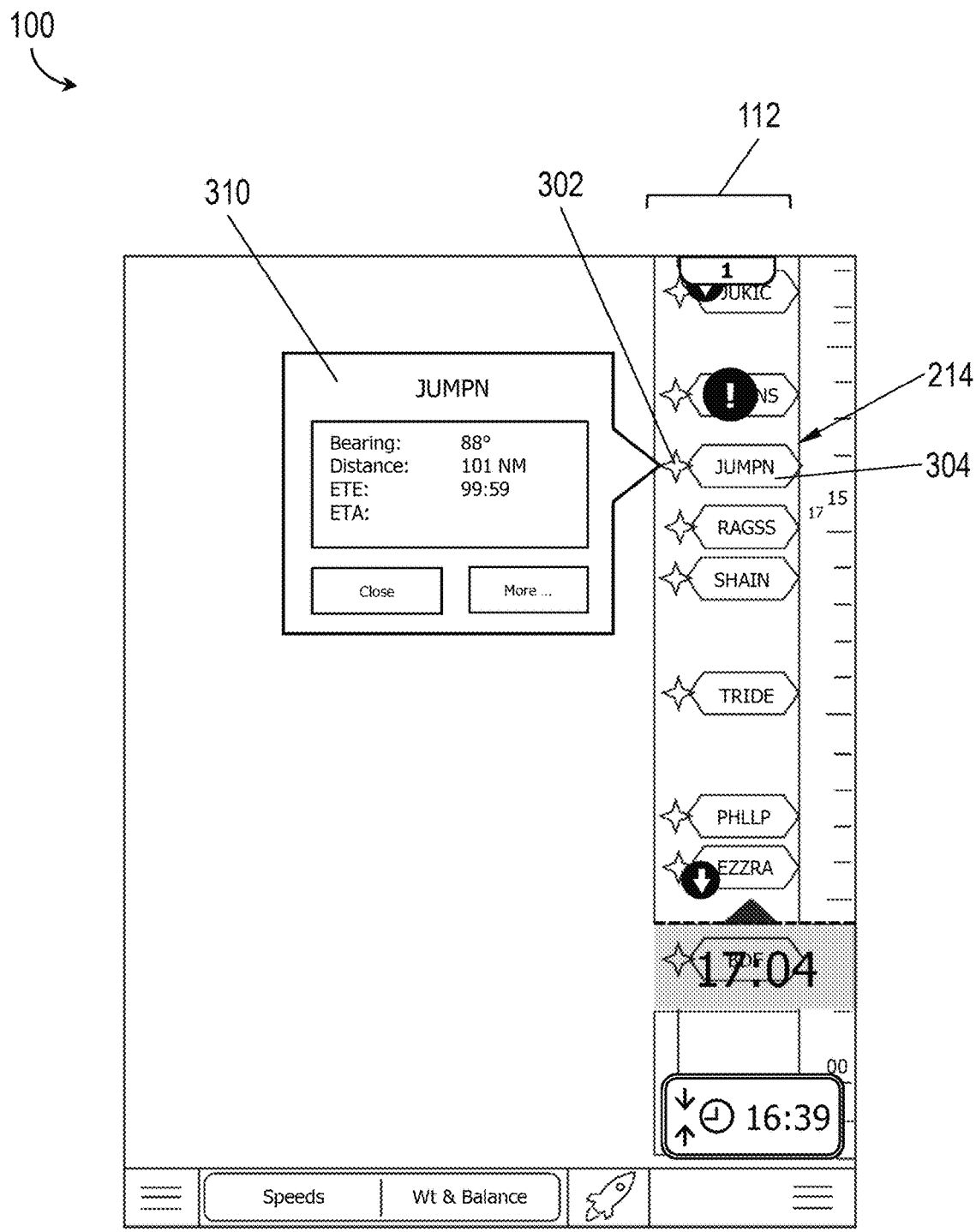

Referring also to FIG. 3C, the pilot or flight crew may access additional information for any waypoint 214 displayed by the space scale 112. For example, by selecting (e.g., via cursor selection or touch-sensitive surface) either the waypoint symbol 302 or waypoint label 304 for any displayed waypoint 214 (e.g., JUMPN), a dialog box 310 may be displayed with any additional information about the JUMPN waypoint known to the FMS, e.g., bearing from the aircraft; distance from the aircraft; estimated time enroute (ETE); estimated time of arrival (ETA).

Figure 4A:
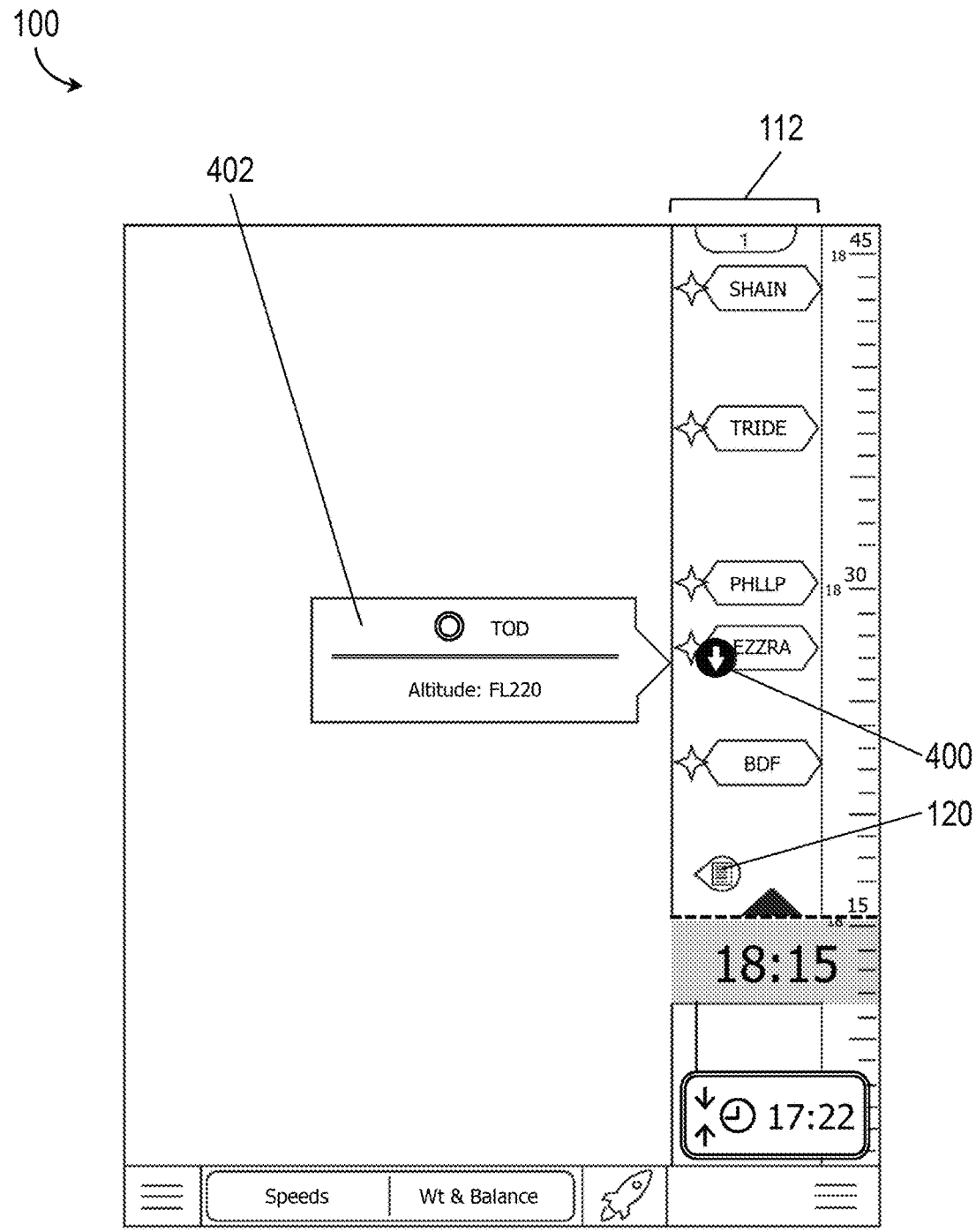
FIGS. 4A and 4B illustrate vertical navigation (VNAV) event displays and information provided by the timeline display of FIG. 1.

Referring to FIG. 4A, the space scale 112 may display other time-distanced events 120 of diverse types and categories.

In embodiments, the avionics display 100 may interrogate the FMS for inflection points in the vertical flight path of the aircraft, e.g., vertical navigation (VNAV) inflection points where the flight path may be modified, e.g., by the Flight Guidance System (FGS). For example, a Top of Descent (TOD) point (e.g., as well as other relevant VNAV inflection points), or a point at which the aircraft abandons its cruising altitude to begin its initial descent to the destination airport, may be indicated by a TOD icon 400 (e.g., a circular icon enclosing an internal arrow indicating the direction of change—down, in the case of an initial descent). By selecting the TOD icon 400, the timeline display 102 may further display VNAV inflection point information. For example, VNAV inflection point information may be indicated by a VNAV dialog box 402 showing that the VNAV inflection point associated with the TOD icon 400 is a TOD point at FL 220 (Flight Level 220, e.g., 22,000 feet).

Figure 4B:
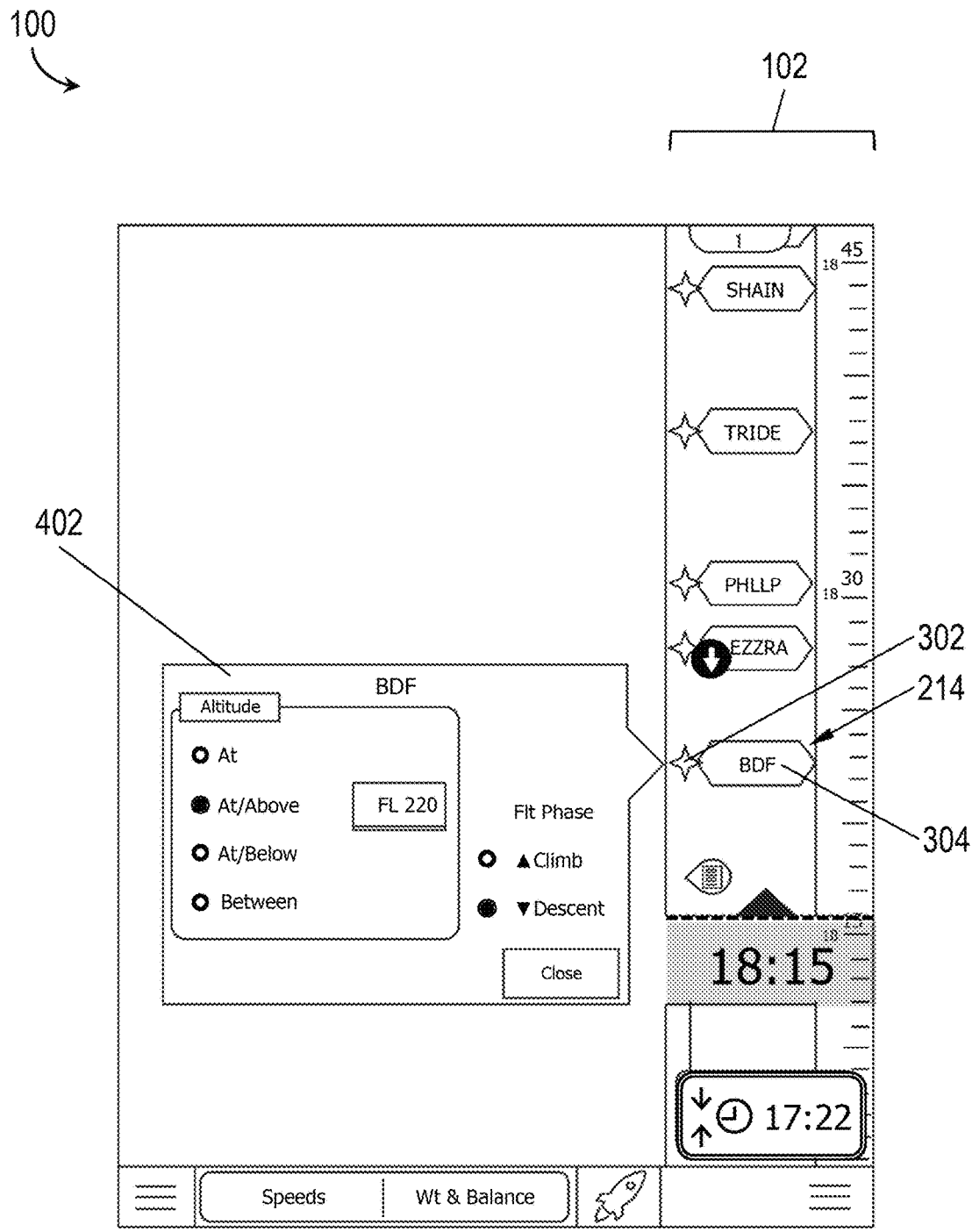

Referring now to FIG. 4B, in embodiments the timeline display 102 may provide VNAV information from the FMS for any waypoint 214 under an altitude constraint. For example, by selecting the waypoint symbol 302 or waypoint label 304, the timeline display 102 may provide VNAV altitude constraint information (e.g., via VNAV dialog box 402) indicating that waypoint BDF must be crossed at or above FL 220. In some embodiments, the VNAV dialog box 402 may allow the pilot or flight crew to modify the altitude constraint, sending the modified value back to the FMS for incorporation into a modified flight plan. For example, once the modified altitude constraint was verified via the FMS, the modified flight plan would be available for execution.

Figure 5:
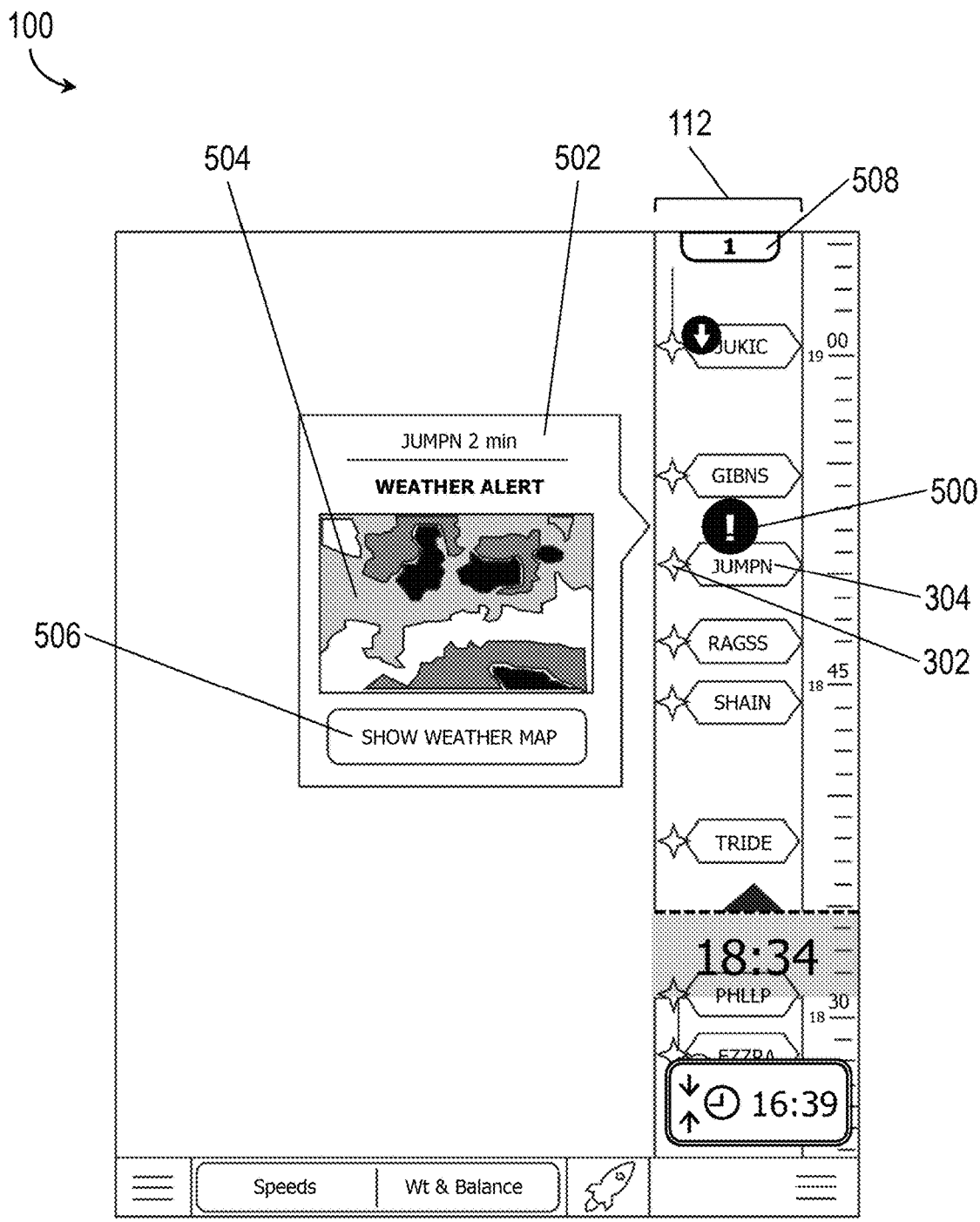
FIG. 5 illustrates weather alerts and information provided by the timeline display of FIG. 1.

Referring now to FIG. 5, in embodiments, the timeline display 102 may display weather alert icons 500 within the space scale 112. For example, the weather alert 500 may be positioned approximately 2 minutes behind the JUMPN waypoint symbol 302 and waypoint label 304 to warn the flight crew of imminent or potentially hazardous weather conditions at that time (e.g., warnings, cautions, or advisories of various levels of severity or priority), given the present course and speed of the aircraft. In embodiments, selecting the weather alert icon 500 may display a weather alert dialog box 502 incorporating a thumbnail-sized weather map 504 of the weather conditions ahead as well as a link 506 for displaying a graphical weather map.

In some embodiments, the timeline display 102 may display similar alerts or notifications based on other timed events, e.g., fuel-reserve alerts, system checks, heading changes, and other like aircraft-based or component-based notifications tracked by the FMS or like applications; frequency changes and other like air traffic control-related events; and or other alerts, notifications, warnings, cautions, or advisories as described below. For example, the timeline display 102 may include a tab 508 indicating the number of alerts (e.g., weather alerts, other alerts) scrolled out of view in the future direction.

Figure 6A:
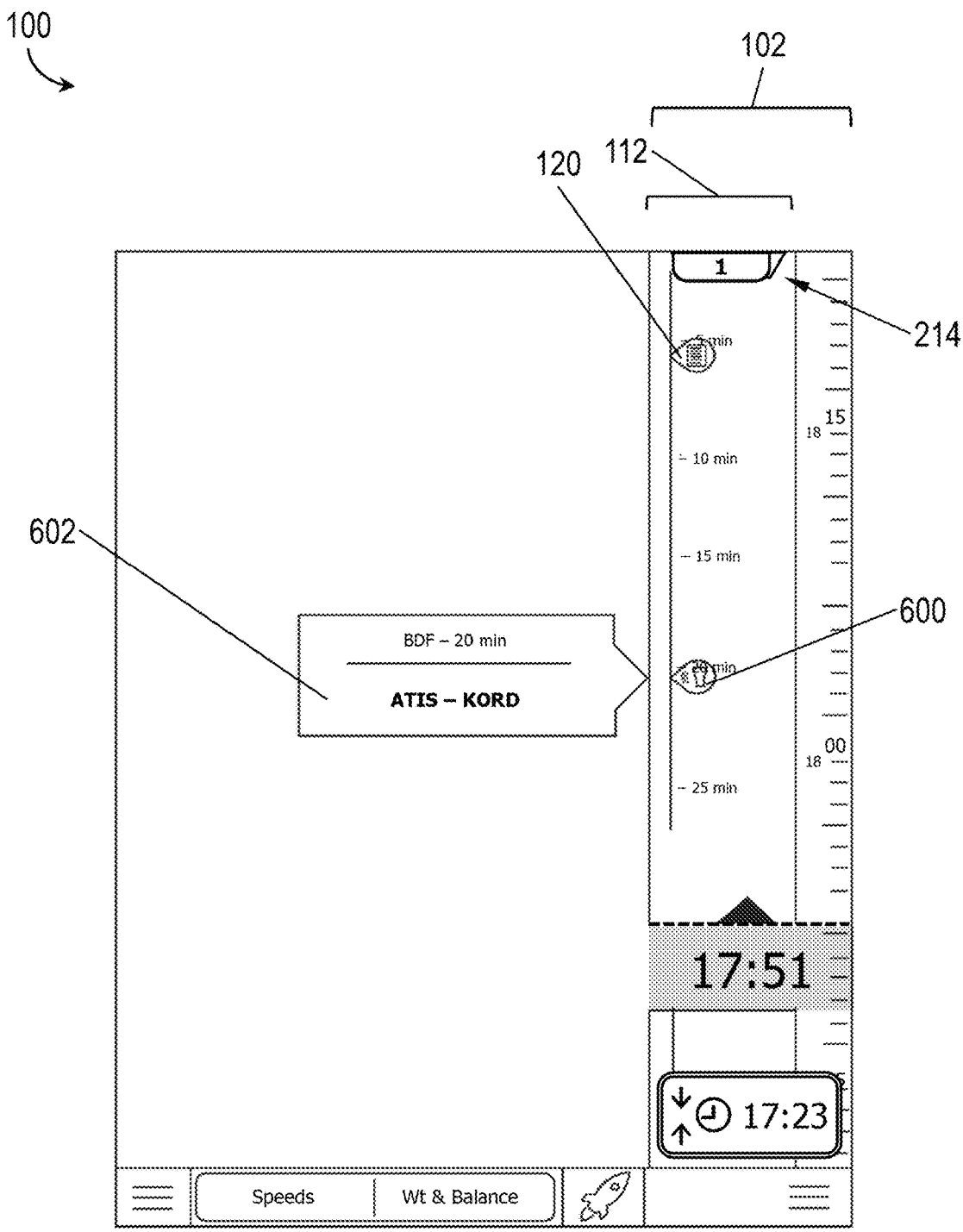
FIGS. 6A through 6C illustrate task notification and reminder notification operations of the timeline display of FIG. 1.

Referring to FIG. 6A, in embodiments the time-distanced events 120 displayed by the timeline display 102 within the space scale 112 may include task notifications 600 (e.g., notifications having a lower severity or priority level than weather alerts (500, FIG. 5) or other alerts as described above). For example, repetitive tasks may be incorporated into the timeline display 102 as periodic reminders to the flight crew to ensure these tasks are completed. The task notification 600 may, for example, be associated with receiving an Automated Terminal Information System (ATIS) weather report for Chicago O'Hare (ORD) twenty minutes prior to flyover of the Bradford VORTAC (BDF) waypoint 214. In embodiments, detailed information about the associated task may be provided by a task notification dialog box 602 displayed upon selection of the task notification 600 by the flight crew.

Figure 6B:
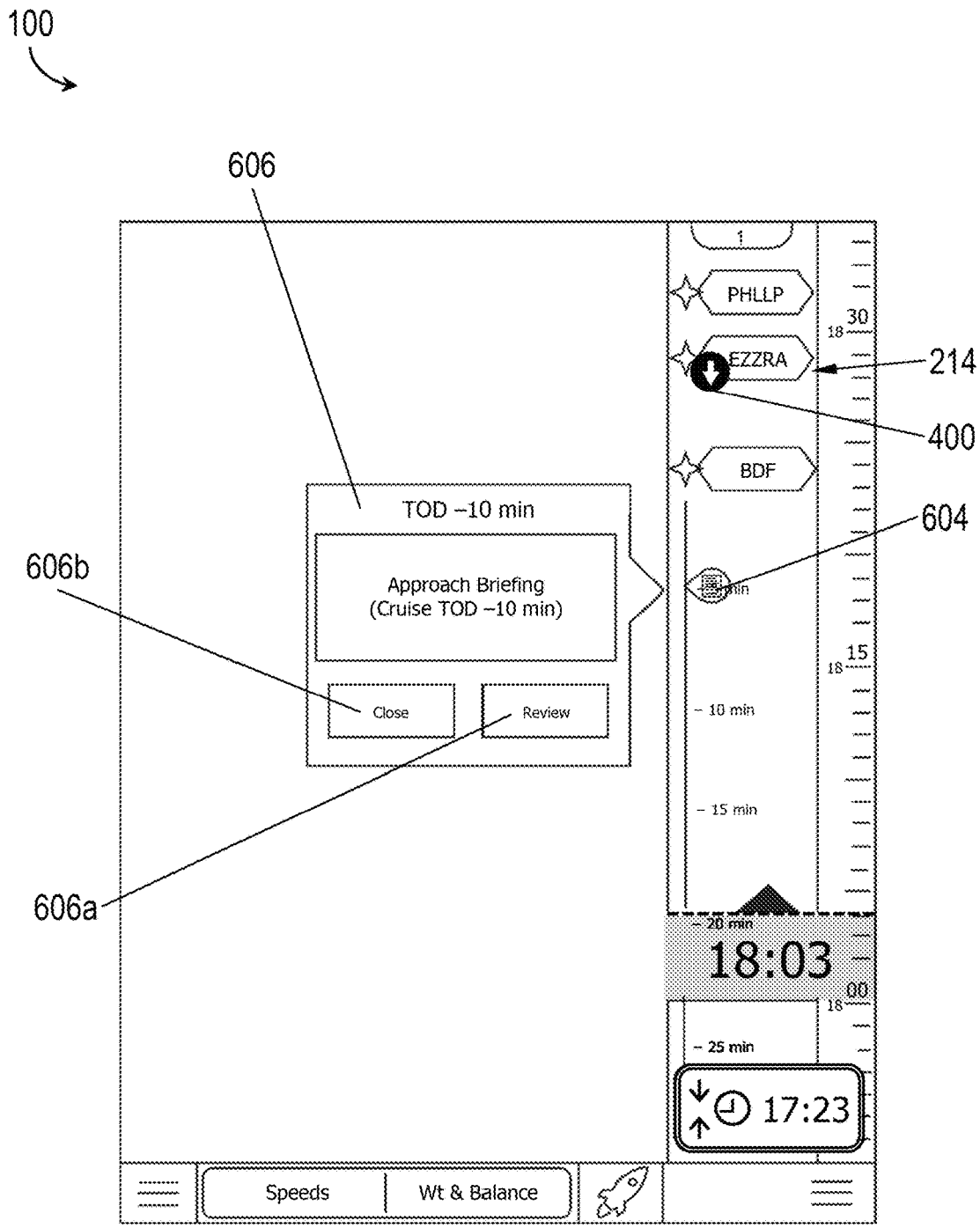

Referring now to FIG. 6B, in embodiments the task notification 604 (e.g., represented by a notepad icon) may be associated with the task of completing the approach briefing ten minutes prior to TOD (TOD icon 400 indicating the EZZRA waypoint 214 as TOD point). For example, an approach briefing dialog box 606 may be displayed upon selection of the task notification 604; the dialog box may further provide the opportunity to review (606a) the approach briefing (e.g., via the approach briefing application) or close out (606b) the dialog box.

Figure 6C:
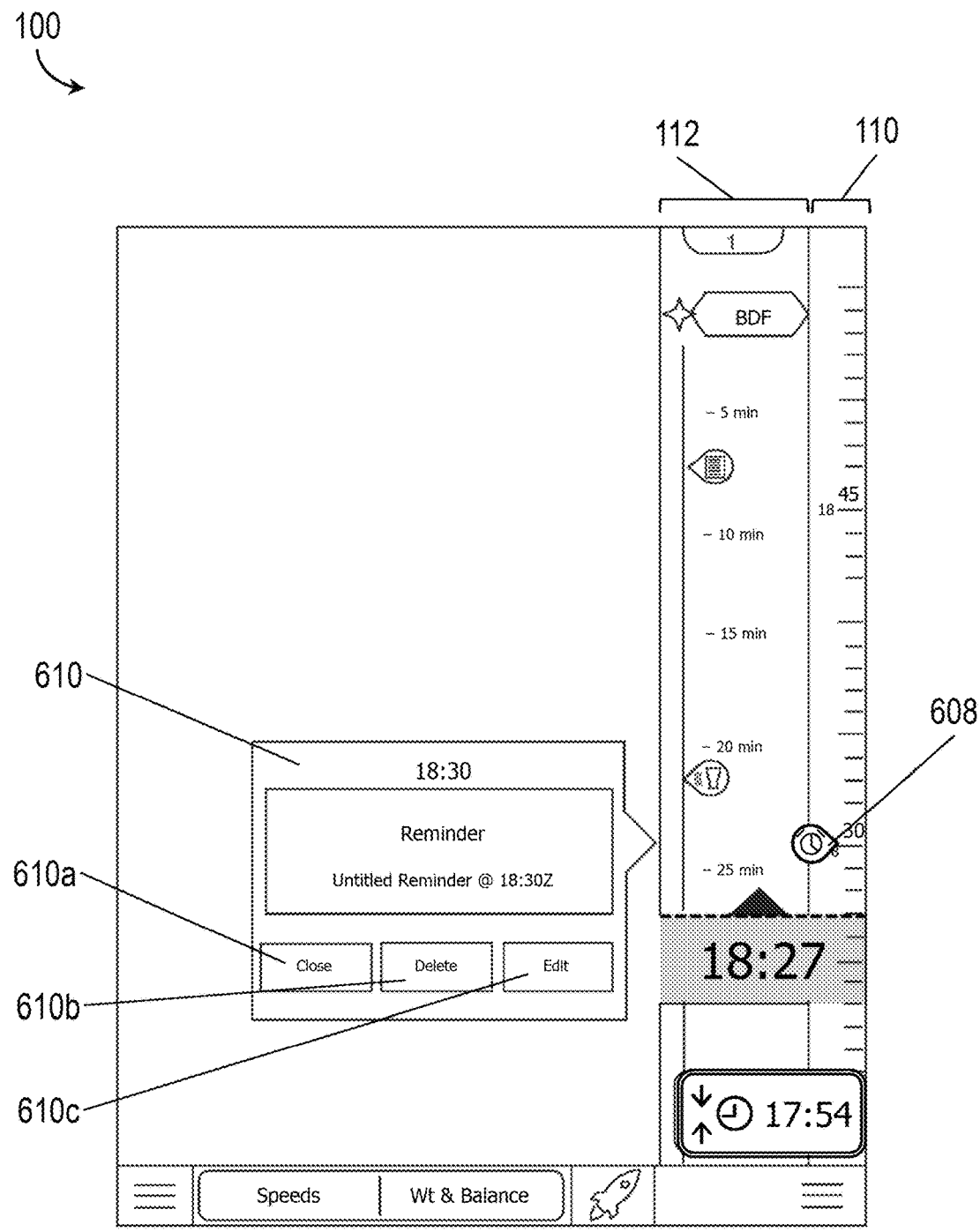

Referring now to FIG. 6C, in embodiments the reminder notification 608 may be associated with a reminder, e.g., a type of note entered by the flight crew (e.g., which may be created in a separate application) and set to deploy at a future point. For example, the reminder notification 608 may be set to deploy at a specific absolute time (e.g., 18:30 Z/UTC) per the time scale 110, or at a specific relative location, e.g., a point in time (or a projected distance from the aircraft) along the space scale 112. In embodiments, a reminder dialog box 610 may be displayed upon selection of the reminder notification 608. For example, the reminder dialog box 610 may provide title, time, and any other information pertinent to the reminder. The reminder dialog box 610 may further allow the flight crew to close out (610a), delete (610b), or edit (610c) the note associated with the reminder notification 608.

Figure 7A:
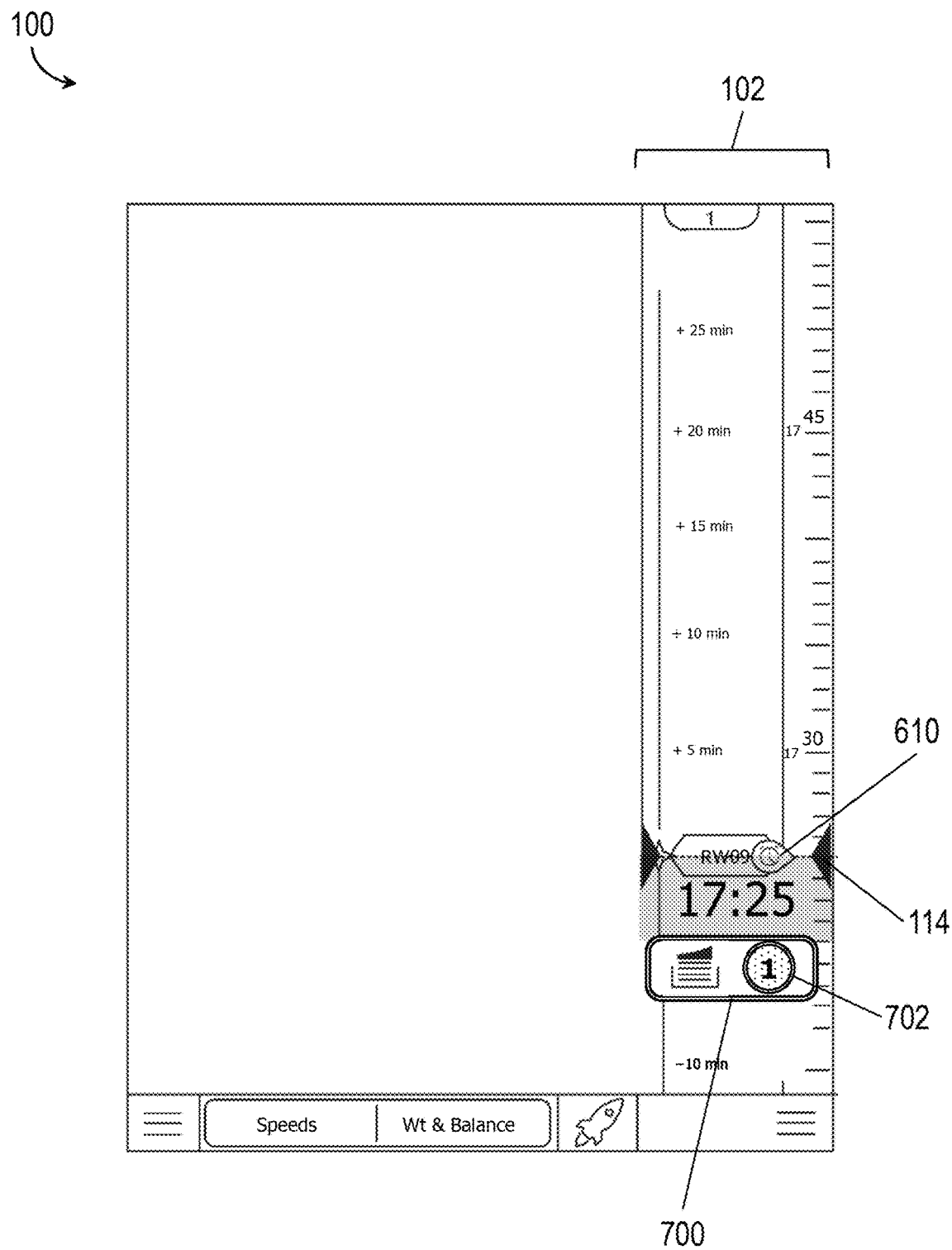
FIGS. 7A and 7B illustrate task queue alert operations of the timeline display of FIG. 1.

Referring to FIG. 7A, one or more task notifications (600, FIG. 6A; 604, FIG. 6B) and/or reminder notifications 608 may cross the time cursor 114 without action or disposition by the flight crew. In embodiments, the timeline display 102 may display a task queue alert 700 below the time cursor 114. For example, the task queue alert 700 may track the number (702) of missed task notifications 600 and reminder notifications 608.

Figure 7B:
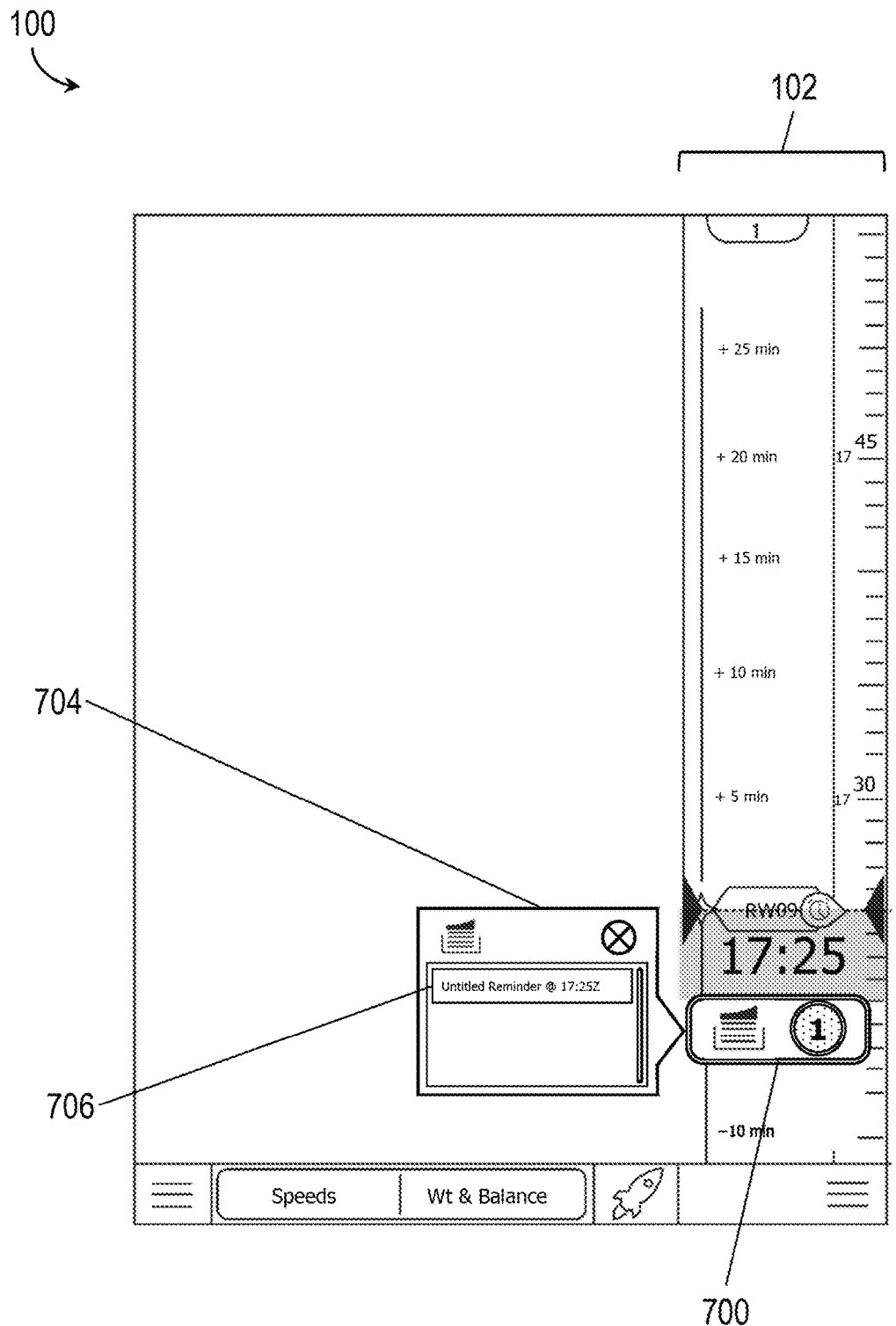

Referring also to FIG. 7B, in embodiments selecting the task queue alert 700 may cause the timeline display 102 to display a task queue dialog box 704. For example, the task queue dialog box 704 may provide additional information 706 about each missed task notification (600) or reminder notification 608 as well as links to any associated applications (for, e.g., associated briefings or notes).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for flight and task management timeline display, comprising:
    an avionics display associated with an aircraft and coupled to a flight management system (FMS) of the aircraft, the avionics display configured to generate a timeline display corresponding to an edge portion of the avionics display, the timeline display divided lengthwise into a time scale and a space scale;
    the time scale configured to display to a user a time range, the time range configured for automatic lengthwise scrolling according to a current time;

and the space scale configured to display one or more of:

a waypoint, the waypoint associated with 1) an arrival time by the aircraft at the waypoint, the arrival time corresponding to an absolute time displayable by the time scale, and 2) a first relative time based on a distance between the arrival time and the current time;

and an event, the event associated with 1) an event time corresponding to an absolute time displayable by the time scale and 2) a second relative time based on a distance between the event time and the current time.

2. The system for flight and task management timeline display of claim 1, wherein:

the timeline display is configured for manual scrolling by the user in 1) a past direction for synchronizing the time range to a past time range and 2) a future direction for synchronizing the time range to a future time range.

3. The system for flight and task management timeline display of claim 2, wherein the timeline display is configured to display a relative time corresponding to the past direction or the future direction.

4. The system for flight and task management timeline display of claim 2, wherein the timeline display further comprises a time synch box configured to display the current time while the time scale displays the past time range or the future time range.

5. The system for flight and task management timeline display of claim 4, wherein the timeline display is configured to synchronize to the current time upon selection of the time synch box by the user.

6. The system for flight and task management timeline display of claim 1, wherein the timeline display is configured for manual zooming by the user for synchronizing the time scale to one of a longer time range and a shorter time range.

7. The system for flight and task management timeline display of claim 1, wherein the space scale is configured to display at least one of:

a waypoint grouping comprising a plurality of proximate waypoints, the waypoint grouping selectable by the user to display each proximate waypoint;

and an event grouping comprising a plurality of proximate events, the event grouping selectable by the user to display each proximate event.

8. The system for flight and task management timeline display of claim 1, wherein:

each waypoint is configured to be selected by the user, the timeline display configured to display waypoint information corresponding to the selected waypoint.

9. The system for flight and task management timeline display of claim 1, wherein:

each event is configured to be selected by the user, the timeline display configured to display event information corresponding to the selected event.

10. The system for flight and task management timeline display of claim 1, wherein the at least one event is selected from a group including:

a vertical navigation (VNAV) inflection point, the VNAV inflection point corresponding to a waypoint;

an alert;

a task for completion by the user;

and a reminder set by the user.

11. The system for flight and task management timeline display of claim 1, wherein:

the timeline display is configured to display at least one task queue alert corresponding to one or more missed events.

12. The system for flight and task management timeline display of claim 11, wherein the at least one task queue alert is selectable by the user to display missed task information corresponding to the one or more missed events.

13. The system for flight and task management timeline display of claim 1, wherein the avionics display is selected from:

a cockpit-based primary flight display (PFD);

an aircraft-based multifunction display (MFD);

and an electronic flight bag (EFB).

14. The system for flight and task management timeline display of claim 1, wherein the timeline display is configured for interaction with the at least one user via one or more of:

a touch-sensitive display surface of the avionics display;

and a multifunctional control (MFC) operatively coupled to the avionics display.

* * * * *